United States Patent [19]

Bollinger

[11] Patent Number: 4,481,164

[45] Date of Patent: Nov. 6, 1984

[54] REACTIVITY CONTROL ASSEMBLY FOR NUCLEAR REACTOR

[75] Inventor: Lawrence R. Bollinger, Schenectady, N.Y.

[73] Assignee: The United States of America as represented by the United States Department of Energy, Washington, D.C.

[21] Appl. No.: 358,962

[22] Filed: Mar. 17, 1982

[51] Int. Cl.³ .............................................. G21C 7/08
[52] U.S. Cl. ................................ 376/233; 376/232; 376/239; 376/260
[58] Field of Search .............. 376/237, 239, 260, 232, 376/233

[56] References Cited

U.S. PATENT DOCUMENTS

| | | | |
|---|---|---|---|
| 3,518,162 | 6/1970 | Lichtenberger | 376/232 |
| 4,110,157 | 8/1978 | Jabsen | 376/233 |
| 4,134,789 | 1/1979 | Aubert | 376/233 |
| 4,369,161 | 1/1983 | Martin | 376/232 |

*Primary Examiner*—Sal Cangialosi
*Attorney, Agent, or Firm*—Michael F. Esposito

[57] ABSTRACT

Reactivity control assembly for nuclear reactor comprises supports stacked above reactor core for holding control rods. Couplers associated with the supports and a vertically movable drive shaft have lugs at their lower ends for engagement with the supports.

7 Claims, 5 Drawing Figures

REACTIVITY CONTROL ASSEMBLY FOR NUCLEAR REACTOR

BACKGROUND OF THE INVENTION

This invention, which resulted from a contact with the United States Department of Energy, relates to a control mechanism for a nuclear reactor and, more particularly, to an assembly for selectively shifting different numbers of reactivity modifying rods into and out of the core of a nuclear reactor.

It has been proposed heretofore to control the reactivity of a breeder reactor by varying the depth of insertion of control rods (e.g., rods containing a fertile material such as $ThO_2$) in the core of the reactor, thereby varying the amount of neutron-thermalizing coolant and the amount of neutron-capturing material in the core. This invention relates to a mechanism which can advantageously be used in this type of reactor control system.

SUMMARY OF THE INVENTION

It is therefore a general object of this invention to provide an improved means for controlling reactivity of a nuclear reactor of the breeder type.

Another more specific object of the invention is to control reactivity of a breeder reactor by selectively shifting different groups of reactivity modifying rods into and out of the core of the reactor.

Still another object of the invention is to provide a compact, reliable latch mechanism for moving different numbers of reactivity control rods into and out of the core of a nuclear reactor.

These objects are attained by means of a preferred latch assembly comprising (1) at least two bodies each having an aperture extending between opposite ends thereof, each aperture including a first axially slotted bore located at one end thereof, a second middle bore having an increased diameter, and an unslotted third bore located at the other end thereof and having a smaller diameter than the second bore, and (2) at least one coupler including a cylindrical connector portion rotatably fitted in the third bore of one of said bodies and projecting outward therefrom, a flange portion projecting radially outward from one end of said connector portion and rotatably held in the second bore of the last-mentioned body, an axially slotted cavity formed in said flange portion and extending axially from the end thereof remote from said connector portion, and a lug projecting radially from said connector portion and spaced from said flange portion. Rotation of the aforesaid couplers to different positions relative to the hubs permits interconnection of different numbers of the hubs.

DETAILED DESCRIPTION OF A PREFERRED EMBODIMENT OF THE INVENTION

Figure 1:
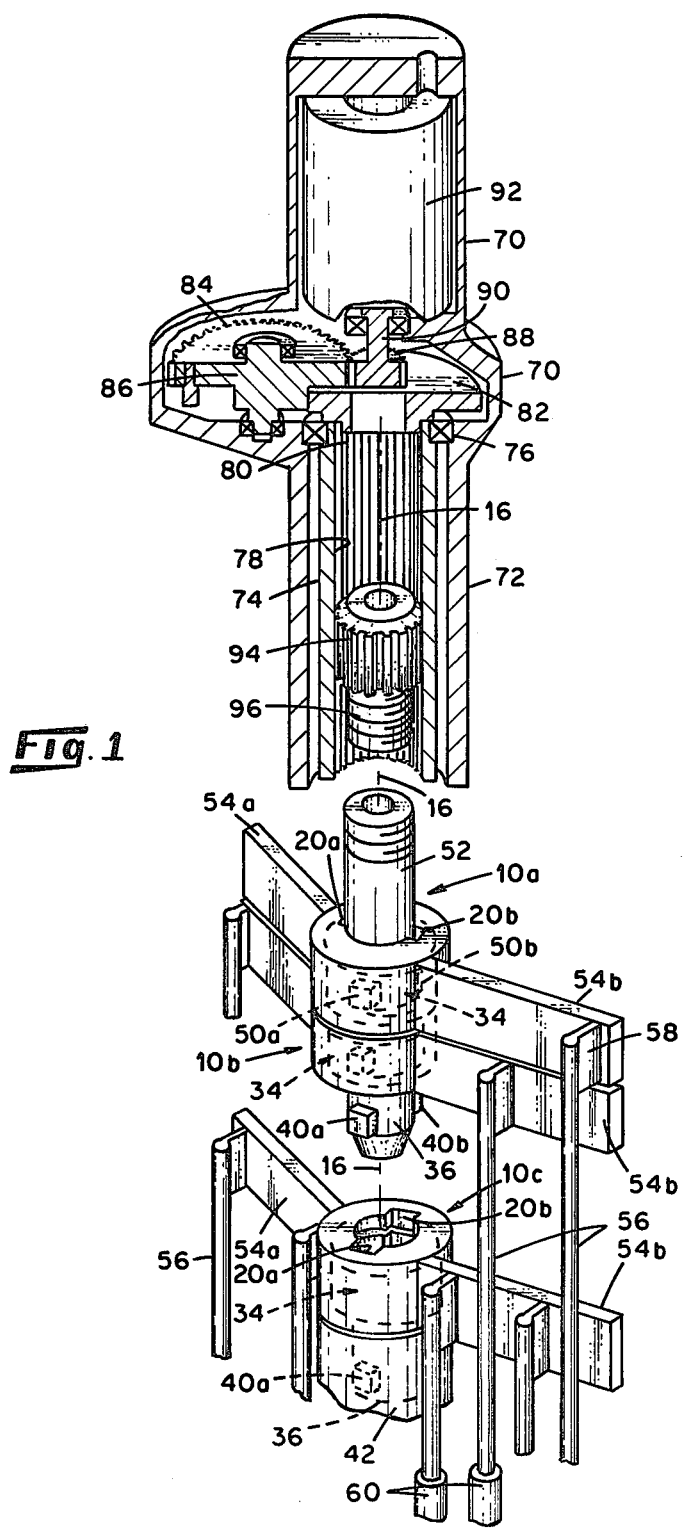
FIG. 1 is a diagrammatic view of components of a preferred embodiment of the invention, portions of a housing, drive elements, and support arms being broken away in the drawing for clarity and simplification.
Figure 2:
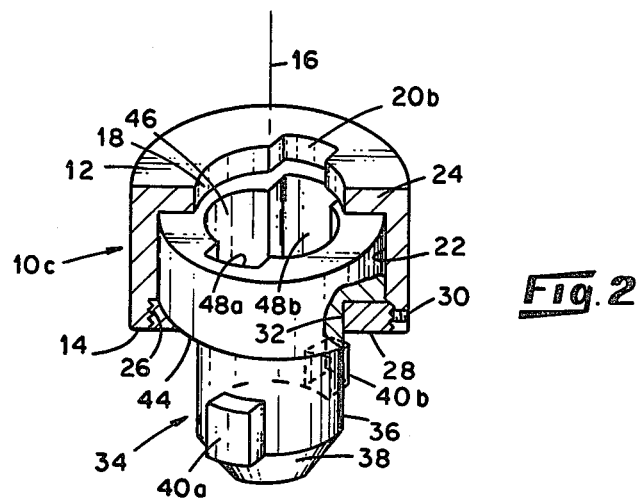
FIG. 2 is an enlarged view of a representative one of the three control rod supports illustrated in FIG. 1, portions of components also being broken away in this drawing.

In FIG. 1, reference numbers $10a, 10b, 10c$ respectively generally designate three identical support bodies, or hubs, that are positioned in vertically stacked relation above a nuclear reactor core (not shown) and centered on a vertical axis 12 that passes through the center of the core. The internal configuration of a typical hub $10c$ is illustrated in FIG. 2, wherein it can be seen that an aperture extends between the upper and lower end surfaces 12,14 of the hub, this aperture being centered on a vertical axis 16 that passes through the center of the reactor core. The aperture in each hub has (1) a first cylindrical bore 18 at its upper end, (2) two slots $20a, 20b$ located at diametrically opposed points on the wall of said first bore and extending axially thereof, only one slot $20b$ being illustrated in hub $10c$ in FIG. 2 but both slots being illustrated in hubs $10a$ and $10c$ in FIG. 1, (3) a second cylindrical bore 22 disposed next to said first bore and having a diameter larger than the diameter of said first bore, thereby forming a shoulder 24 at the upper end of the described aperture, and (4) a threaded counterbore 26 located at the lower end of the aperture. A washer-shaped retainer plate 28 is threadedly engaged within counterbore 26 and extends transversely of the lower end of each hub $10a-10c$, a set screw 30 mounted in the side wall of the hub holding this retainer plate in position. The cylindrical aperture 32 of retainer plate 28 is centered on axis 16 and its diameter is equal to the diameter of first bore 18. In certain claims appended hereto, aperture 32 is referred to as the third bore of a hub.

Associated with each hub $10a-10c$ is a coupler 34 having the configuration illustrated in FIG. 2. More particularly, the coupler of each hub includes the following parts: (1) a cylindrical connector portion 36 which has a diameter slightly smaller than the diameter of aperture 32 in retainer plate 28 and which is rotatably fitted in that aperture; (2) a frustoconical tip 38 at the lower end of the connector portion; (3) two connecting lugs $40a, 40b$ which project radially outward from the lower end of the connector portion at diametrically opposed points thereon and which, on the couplers of hubs $10a$ and $10b$, are sized to slide through the slots $20a, 20b$ of the subjacent hub and, on the coupler for hub $10c$, are sized to slide through corresponding slots in a holding member 42 further described hereinafter: and (4) a cylindrical flange 44 (generically referred to as the detent portion of the coupler in certain claims appended hereto) which projects radially outward from the upper end of the connector portion, which has a diameter slightly smaller than the diameter of second bore 22 of the associated hub, and which is rotatably held in said bore between shoulder 24 and retainer plate 28. A cylindrical cavity 46 extends downwardly into flange 44 from its upper surface, this cavity being coaxial with connector portion 36 and terminating above the lower surface of the flange. Two slots $48a, 48b$ extend axially of the wall of cavity 46 at diametrically opposed points thereon, these slots being sized, on the couplers for hubs $10b$ and $10c$, to slidably receive the connecting lugs $40a, 40b$ of the couplers of hubs $10a$ and $10b$, respectively, and, on the coupler for hub $10a$, to slidably receive connecting lugs 50a,50b which project radially outward from the lower end of a vertically disposed shaft 52 at diametrically opposed points thereon.

Two horizontal support arms 54a,54b are attached to the side wall of each hub 10a–10c at opposed points thereon, these arms (the ends of which are removed in FIG. 1 to simplify the drawing) extending radially outward from the associated hub to a point substantially in vertical alignment with the perimeter of the reactor core thereunder. The upper ends of a number of vertically disposed control rods 56 are attached to each support arm 54a,54b by means of connecting elements 58. Control rods 56 are spaced apart from one another in the reactor core in the usual manner and their lower ends are slidably held in guide tubes 60 that extend into the core. It will be understood that the number of support arms and control rods connected to hubs 10a–10c can be varied as required for controlling reactivity of the reactor core.

Figure 3:
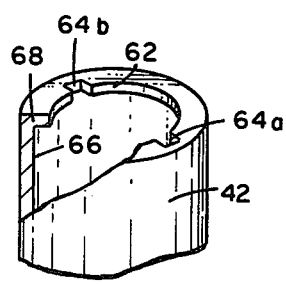
FIG. 3 is a pictorial view of a holding member illustrated in FIG. 1, a portion of the wall of this part being away from in the drawing so that the configuration of an aperture therein can be seen.

Coaxially positioned below the stack of hubs 10a–10c and fixedly centered relative to the reactor core is the aforementioned holding member 42. As illustrated in FIG. 3, the internal configuration of holding member 42 corresponds with that of each hub 10a–10c inasmuch as the holding member has an aperture therein which includes (1) a first cylindrical bore 62 at its upper end, (2) two slots 64a,64b extending axially across said first bore at diametrically opposed points thereon, and (3) a second cylindrical bore 66 which has a diameter larger than the diameter of the first bore and thereby forms a shoulder 68 at the upper end of the holding member. Holding member 42, like hubs 10a–10c, is centered on axis 16.

Projecting downwardly from a fixedly positioned housing 70 and also centered on axis 16 is a vertically disposed tube 72 which terminates above the point to which the uppermost hub 10a is raised when the control rods connected thereto are removed from the reactor core. A second tube 74 is concentrically and rotatably held in tube 72 by suitable means including a bearing 76. Splines 78 are spaced around and extend lengthwise of the inner surface of tube 74, and gear teeth 80 on the underside of the driven element 82 of a geneva movement mesh with these splines at the upper end of the tube. Gear teeth 84 on the driving element 86 of the geneva movement mesh with teeth of a gear 88 mounted at the lower end of the drive shaft 90 of a suitable drive means 92 located in the upper portion of housing 70.

Fixed to the upper end of shaft 52 is a gear 94, the teeth of which mesh with splines 78 on tube 74. As will be understood by persons skilled in the design of nuclear reactors, a rotatable nut can be engaged with a helical thread 96 formed on shaft 52 to translate the shaft in opposite directions along its longitudinal axis 16. A rotating fixed nut drive used for raising or lowering a nuclear reactor control rod is described on page 197, Vol. 2, of "The Technology of Nuclear Reactor Safety", published by The M.I.T. Press in 1973.

Figure 4:
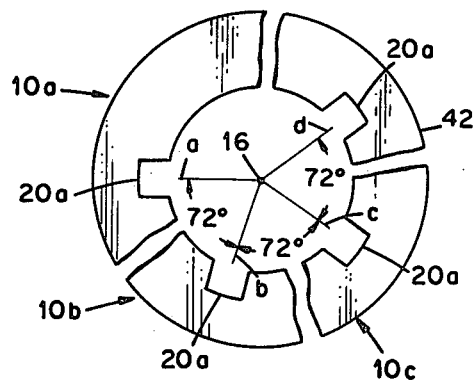
FIGS. 4 and 5 are detail plan views of components illustrated in FIG. 1.
Figure 5:
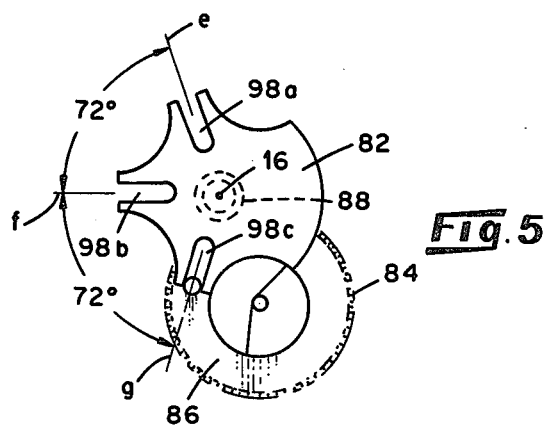

Rotation of hubs 10a–10c about axis 16 is prevented by control rods 56 which extend into the fixed guide tubes 60. Thus the slots 20a,20b in each hub 10a–10c are maintained in the same angular position relative to axis 16 when they are raised or lowered by shaft 52 as will be presently described. It can be seen in FIG. 1 that the angular positions of slots 20a,20b in hubs 10a and 10c relative to axis 10 are different. Moreover, as illustrated in FIG. 4 (which is a plan view of portions of hubs 10a–10c and holding member 42), the angular position of a pair of slots 20a,20b in any one of the hubs 10a–10c, relative to axis 16, is different from that of the slots 20a,20b in the other two hubs and that of the slots 64a,64b in holding member 42. In the described preferred embodiment of the invention, there is an angle of 72° between the lines a and b in FIG. 4, which respectively pass through axis 16 and bisect slots 20a,20b in hubs 10a and 10b. Likewise, there is an angle of 72° between the aforesaid line b and the line c which passes through axis 16 and bisects the slots 20a,20b in hub 10c, and the angular relation between the last-mentioned slots and slots 64a,64b in holding member 42 follows the same pattern. Also, as illustrated in FIG. 5, there is an angle of 72° between lines e, f, g, which respectively pass through axis 16 and bisect the slots 98a,98b,98c in the driven element 82 of the above-described geneva movement for rotating shaft 52.

OPERATION OF PREFERRED EMBODIMENT OF THE INVENTION

The length of first bore 18 of each hub 10a–10c and the length of first bore 62 in holding member 42 (i.e., the vertical width of shoulder 24 in each hub and shoulder 68 in the holding member) is less than the spacing between flange 44 and connecting lugs 40a,40b on couplers 34. Hence when two hubs are in juxtaposition (as illustrated by hubs 10a and 10b in FIG. 1), the connecting lugs 40a,40b on the coupler 34 of the uppermost hub are disposed in slots 48a,48b formed in the wall of the cavity 46 in the coupler of the lowermost hub. Furthermore, when hub 10c is juxtaposed to holding member 42 as illustrated in FIG. 1, the connecting lugs 40a,40b on the coupler 34 associated with that hub are disposed in second bore 66 of the holding member.

By means of the components which have been described, groups of the control rods 56 connected to hubs 10a–10c can be successively lowered into or lifted out of the reactor core which lies under the hubs. For example, if all hubs are in lowered position (i.e., hub 10c resting on and connected to holding member 42, and the hubs stacked in contact with and connected to one another) and shaft 52 is raised above the stacked hubs, either partial or complete removal of the control rods 56 connected to hub 10a from the reactor core can be accomplished by rotating lugs 50a,50b on shaft 52 to a position wherein said lugs are vertically aligned with slots 20a,20b in hub 10a. It can be assumed that in this position of shaft 52, the components of the geneva movement are in the position illustrated in FIG. 5. Shaft 52 is then lowered to slide its connecting lugs 50a,50b through slots 20a,20b of hub 10a and into slots 48a,48b of the coupler 34 associated with said hub. Next shaft 52 is rotated 72° about axis 16 by the geneva movement to bring the connecting lugs 50a,50b on the shaft into vertical alignment with slots 20a,20b in hub 10b, which movement also rotates connecting lugs 40a,40b of the coupler 34 associated with hub 10a through the same angle and aligns said lugs 40a,40b of that coupler with slots 20a 20b, respectively, of hub 10b. Finally, shaft 52 is lifted, which engages its connecting lugs 50a,50b with the underside of shoulder 24 on hub 10a and thus lifts hub 10a and the control rods 56 connected thereto to either a partially removed or completely removed position relative to the reactor core, depending on the distance travelled by the shaft. When connecting lugs 50a,50b on shaft 52 and connecting lugs 40a,40b of the coupler 34 associated with hub 10a are positioned as just described, lugs 40a,40b of said coupler slide through slots 20a,20b of hub 10b, and hub 10b is thus not lifted. As indicated hereinbefore, when all three hubs 10a-10c are juxtaposed in their lowered position, lugs 40a,40b of the couplers 34 of hubs 10a and 10b are respectively positioned in slots 48a,48b of the couplers of hubs 10b and 10c, and therefore when shaft 52 is rotated its connecting lugs 50a,50b rotate all of the couplers and their lugs 40a,40b are maintained in vertical alignment with lugs 50a,50b.

If partial or complete removal of the control rods 56 connected to both hub 10a and hub 10b is required, after shaft 52 has been lowered to insert its connecting lugs 50a,50b into slots 48a,48b of the coupler 34 associated with hub 10a, drive means 92 is operated to rotate the shaft 144° about axis 16. Rotation of shaft 52 through that angle moves connecting lugs 50a,50b on shaft 52 and connecting lugs 40a,40b on the couplers 34 associated with hub 10a and hub 10b into vertical alignment with slots 20a,20b in hub 10c. Then when shaft 52 is lifted, its connecting lugs 50a,50b engage the underside of shoulder 24 on hub 10a and thus lift hub 10a. When hub 10a is raised, connecting lugs 40a,40b on its coupler 34 are now in a position out of alignment with slots 20a,20b in hub 10b, and therefore the connecting lugs of that coupler engage the underside of shoulder 24 on hub 10b and the hub 10b is lifted along with hub 10a. In the described position of shaft 52, connecting lugs 40a,40b of the coupler associated with hub 10b are vertically aligned with slots 20a,20b in hub 10c, and consequently hub 10c is not lifted.

It will be evident from the above description that all three of the hubs 10a-10c can be elevated by rotating shaft 52 through an angle of 216° about axis 16 after its connecting lugs 50a,50b have been inserted through slots 20a,20b in hub 10a and into slots 48a,48b of the coupler 34 of that hub. It will also be evident that all hubs not lifted by shaft 52 will be interconnected with each other and with holding member 42 by couplers 34. Insertion of the control rods 56 connected to one, two, or three of the hubs 10a-10b into the reactor core can be effected by reversing the above-described steps. The geneva movement illustrated in FIG. 5 provides the four angular position of shaft 52 required for lifting one, two, or three hubs 10a-10c or for releasing all of the hubs.

Various modifications can obviously be made in the disclosed latching assembly without departing from its principles of construction and operation. For example, in some applications only one connecting lug 50a on shaft 52 and one connecting lug 40a on each coupler 34 may suffice, and with this construction only one slot 20a in hubs 10a-10c and one slot 48a in the couplers would be required.

What is claimed is:

1. A latch assembly comprising:
   a first body through which extends an aperture including (1) a first cylindrical bore located at one end thereof, (2) a slot extending axially along the wall of said first bore, (3) a second middle bore having a diameter larger than the diameter of said first bore, and (4) a third cylindrical bore located at the other end of said aperture in coaxial relation with said first bore and having a diameter smaller than the diameter of said second bore;
   a coupler comprising (1) a cylindrical connector portion rotatably fitted in said third bore of said first body and projecting outward therefrom (2) a detent portion projecting radially outward from one end of said connector portion and rotatably held in said second bore of said first body, (3) a cylindrical cavity formed in said detent portion in coaxial relation with said connector portion and extending axially of said detent portion from the end thereof remote from said connector portion, (4) a slot extending axially along the wall of said cavity, and (5) a connecting lug projecting radially from said connector portion and spaced from said detent portion;
   a second body having therein an aperture including (1) a first cylindrical bore located at one end of said aperture and sized to slidably receive said connector portion of said coupler, the length of said first bore being less than the spacing between said detent portion and said connecting lug of said coupler, (2) a slot extending axially along the wall of said first bore and sized to slidably receive said connecting lug on said coupler, and (3) a second bore having a diameter larger than the diameter of said first bore, said connecting lug on said coupler being held in said second bore when said first and second bodies are coupled together;
   means for holding said first and second bodies so that (1) said apertures therein are centered on the same axis and (2) said slots therein face in the same direction relative to said axis and are located at different angular positions thereabout; and
   a shaft located on the side of said first body remote from said second body and coaxial with said apertures in said bodies, and said shaft being movable toward and away from said bodies and rotatable about its longitudinal axis and a connecting lug projecting radially from the end of said shaft adjacent said first body, said connecting lug being sized to slide in said slot in said first body and being held in said second bore of said first body when said shaft is coupled to said first body.

2. The assembly of claim 1 wherein the aperture in said second body comprises a third cylindrical bore located at its end remote from said first bore therein and coaxial with said first bore, and including:
   a second coupler comprising (1) a cylindrical connector portion rotatably fitted in said third bore of said second body and projecting outward therefrom, (2) a detent portion projecting radially outward from one end of said connector portion and rotatably held in said second bore of said second body, (3) a cylindrical cavity formed in said detent portion in coaxial relation with said connector portion and extending axially of said detent portion from the end thereof remote from said connector portion, (4) a slot extending axially along the wall of said cavity, and (5) a connecting lug projecting radially from said connector portion and spaced from said detent portion;
   a third body having therein an aperture including (1) a first cylindrical bore located at one end thereof and sized to slidably receive said connector portion of said second coupler, the length of said first bore being less than the spacing between said detent portion and said connector portion on said second coupler, (2) a slot extending axially along the wall of said first bore and sized to slidably receive said lug on said second coupler, and (3) a second bore having a diameter larger than the diameter of said first bore, said lug on said second coupler being held in said second bore when said second and third bodies are coupled together; and means for holding said third body so that (1) said aperture therein is centered on the same axis on which the apertures in said first and second bodies are centered, (2) said slot therein faces toward said second body, and (3) said slots in said first, second, and third bodies are located in different angular positions about said axis.

3. A reactivity control assembly for a nuclear reactor, comprising:

a plurality of interconnectible supports disposed in stacked relation above the core of said reactor and each comprising (1) a hub having an aperture extending between upper and lower ends thereof, said aperture including a first cylindrical bore at its upper end, a slot extending axially across the wall of said first bore, and a second cylindrical bore coaxially disposed below said first bore and having a diameter larger than the diameter of said first bore, (2) a retainer plate attached to and extending transversely of the lower end of said hub, said retainer plate having a cylindrical aperture extending between the upper and lower sides thereof, said aperture being coaxial with said first and second bores and having a diameter smaller than the diameter of said second bore, (3) a plurality of support arms attached to and radiating from said hub, and (4) a coupler including a cylindrical connector portion rotatably fitted in the aperture in said retainer plate and projecting downward therefrom, a connecting lug attached to and projecting radially outward from the lower end of said connector portion, and a cylindrical flange attached to and projecting radially outward from the upper end of said connector portion and rotatably held in said second bore of said hub, a cavity extending downwardly from the upper surface of said flange portion in coaxial relation with the aperture in said hub and a slot extending axially along the wall of said cavity;

a plurality of vertically disposed control rods connected in groups at their upper ends to respective ones of said support arms of said supports and extending downward therefrom for insertion into the core of said reactor when in a lowered position;

aligning means for holding said supports so that said apertures in said hubs thereof are centered on the same vertical axis and said slots in said first bores of said apertures are located at different angular positions about said axis;

a vertically disposed shaft positioned above said supports in coaxial relation with said apertures therein, a connecting lug being attached to and projecting radially from the lower end of said shaft: and drive means for rotating said shaft about its longitudinal axis and moving it in opposite directions along said axis.

4. The assembly of claim 3 wherein said aligning means comprises guide tubes fixed in position relative to the core of said reactor and respectively holding the lower portions of said control rods.

5. The assembly of claim 3 wherein said drive means comprises a geneva movement for rotating said shaft.

6. The assembly of claim 3 including a holding member fixed in position below said supports and having a cavity extending downward from its upper surface, said cavity being coaxial with the apertures in said supports and including a first cylindrical bore at its upper end, a slot extending axially across the wall of said first bore, and a second cylindrical bore coaxially disposed below said first bore and having a diameter larger than the diameter of said first bore, said slot and the slot in the hub of the lowermost one of said supports being located at different angular positions relative to the vertical axis on which the apertures of said holding member and supports are centered.

7. The assembly of claim 6 wherein:

two lugs project radially outward from the lower end of said shaft and from the lower end of the connector portion of each of said couplers at diametrically opposed points thereon: and two slots extend axially of the first bore of said holding member, the first bore of each of said hubs, and the cavity of each of said couplers at diametrically opposed points thereon.

* * * * *